United States Patent Office 3,359,471
Patented Dec. 19, 1967

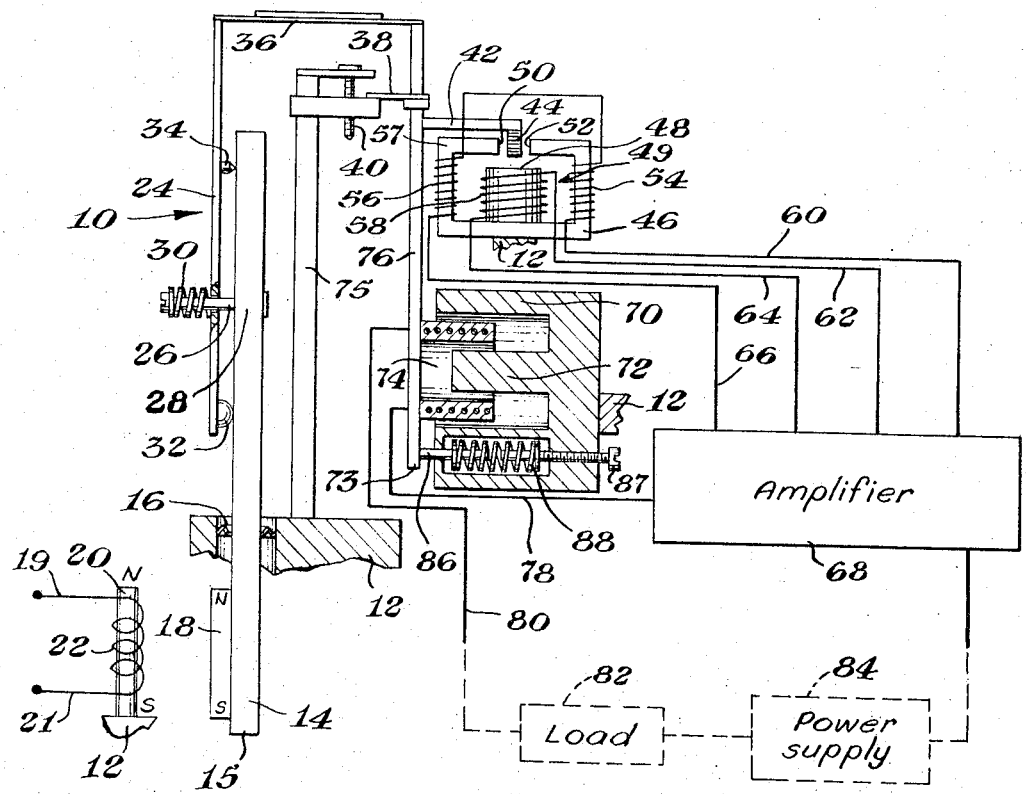

3,359,471
FORCE BALANCE SYSTEM FOR SENSING THE FORCE BETWEEN TWO PERMANENT MAGNETS
Porter Hart, Lake Jackson, and Alfred V. Baker, Freeport, Tex., assignors to The Dow Chemical Company, Midland, Mich., a corporation of Delaware
Filed June 1, 1964, Ser. No. 371,409
12 Claims. (Cl. 318—22)

This invention relates to apparatus for actuating process control or other elements by means of intermittent signals in accordance with a desired predetermined functional relationship.

A number of approaches have been made towards controlling chemical or other manufacturing processes from a single centralized or remote location with respect to valves or other elements being controlled.

Pneumatic control exercised from a central location is one approach.

In another approach a continuous electrical signal is passed through a coil coupled to a soft iron magnetizable element to provide a magnetic field of predetermined strength which is then coupled directly to a controlled element or indirectly to the control element through a pneumatic controller device.

So far as is known, the prior art systems or methods for actuating process control elements in accordance with a predetermined functional relationship suffer from one or more of the following problems:

(a) The speed at which actuating control is asserted or changed is too slow either for the process being controlled or for efficient and/or effective coupling to the means for determining the desired predetermined functional relationship;

(b) The apparatus is unduly complex with respect to the work the apparatus accomplishes;

(c) The apparatus is rather expensive with respect to the work being accomplished;

(d) The reliability of the apparatus is not as good as could be desired, resulting in substantially less than optimum process control;

(e) The stability of the control system, e.g. wherein the day to day application of the same control signal results in the same degree of valve control, for example, may be less than is desired;

(f) In event the control apparatus becomes inoperative, the degree of safety in further operation or shut down of the process being controlled is less than can be tolerated;

(g) The apparatus controls the process in discrete changes in adjustment of process equipment which are larger than can be conveniently used;

(h) Each element controlled requires for its control a continuous sampling signal from the computer or other device which calculates the degree of control required, or (i) The control system isn't compatible for use with existing actuating devices.

Accordingly, a principal object of this invention is to provide improved apparatus for actuating process control or other elements.

Another object of this invention is to provide an improved, more economical apparatus for actuating process control or other elements.

A further object of this invention is to provide an improved, more reliable apparatus for actuating process control or other elements on a continuous basis from control signals applied on a discontinuous basis.

An additional object of this invention is to provide an improved apparatus for actuating control or other elements with a great degree of resolution.

In accordance with this invention there is provided a pivoted balance beam which has a permanent magnet fixedly coupled thereto one side of said pivot and a laminated metal core element mechanically coupled thereto on another side of the pivot. A second permanent magnet, disposed adjacent to said first permanent magnet, has an electromagnetic coil surrounding it whereby, by pulsing the coil, the magnetism of the magnet may be set at a predetermined value at a predetermined time.

The laminated core element is disposed in the air gap of a special transformer-like detector. Any movement of the core element changes the output voltage of the detector. The output of the detector is coupled to an amplifier whose output is coupled to a load in series with an electromagnetic coil which is coupled to said balance beam near the end of the beam which is remote from the permanent magnet.

The interaction of the fields of the two permanent magnets causes a force to be exerted on the balance beam which tends to move the movable core element. Any movement of the core element causes the output of an amplifier to change, causing a restoring force to be applied to the balance beam via the coil attached to the beam and an adjacent magnet. The change in output current of the amplifier is applied to a load device for use in carrying out a control function.

Usually variations in amplifier output in the order of 10 to 50 milliamperes are achieved, the amount depending on the degree of magnetism induced in the electromagnetically settable permanent magnet disposed adjacent to the permanent magnet along the balance beam.

The invention, as well as additional objects and advantages thereof, will best be understood when the following detailed description is read in connection with the accompanying drawings, in which:

FIGURE 1 is a diagrammatical view of control element positioning apparatus in accordance with this invention, and FIGURE 2 is a schematic diagram of a simplified pulsing circuit for use in pulsing the electromagnetic element in FIGURE 1.

Referring to the drawing, there is shown control element positioning apparatus, indicated generally by the numeral 10, a base 12, a multiple part balance beam which is coupled to a pivot element 16 intermediate the ends of the beam section 14, and a beam section 76 which is supported from the support bar structure 75 and is movable with respect to the pivot element 38. Mechanical coupling is provided between the beam section 14 and the beam section 76 through the over-range bar 24 and the coupling element 36. The over-range bar 24 is mechanically coupled to the beam section 28 by means of a bolt 26 which extends through the section 28 and the bar 24, and a pair of fulcrum elements 32, 34 which are secured to the bar 24, one on each side of the bolt 26. The fulcrum elements 32, 34 are each held against the beam section 28 by means of the spring 30 which forces the bar 24 towards the beam section 28.

A laminated metal section 44 is mechanically coupled to the beam section 76 through a bar 42 which extends transversely from the section 76. The bar 42 is coupled to the section 76 adjacent to but spaced from the pivot element 38.

The laminated section 44 is disposed in the air gap between the pole pieces 50, 52 of the generally E shaped core of the detector 49 of the invention. Each of the end arms 46, 57 have windings 54, 56, respectively, along their lengths, the windings 54, 56 being connected in series and through the leads 60, 66 to the input of an amplifier 68 as is well known in the art. A winding 58 is disposed around the element 48 of the detector core and is connected through the leads 62, 64 to the input of the amplifier 68.

An electromagnetic coil 74 which is tubular in configuration is mechanically coupled to the beam section 76 at a location which is closer to the end 73 of the section 76 than it is to the pivot element 38. The longitudinal axis of the coil 74 is generally perpendicular to the longitudinal axis of the beam section 76. The coil 74 is adapted to telescope within a cup shaped magnet 70 which has a cylindrical magnetic element 72 extending parallel with the side walls from the bottom of the cup. The side walls of the magnet 70 and the element 72 are substantially parallel with the walls of the coil 74. The magnet 70, as is the detector 49, is supported from the frame 12.

The coil 74 is coupled through the lead 78 to the output of the amplifier 68 and through the lead 80 to the amplifier 68 in series with a load 82 and power supply 84.

A permanent magnet 18 is fixedly mechanically coupled to the beam section 14 at a location which is near the end 15 of the section 14. Usually the magnet 18 is a bar magnet and is disposed with its longitudinal axis parallel to the longitudinal axis of the beam section 14.

A second magnetic element 20, which is made of material which may be "permanently" magnetized, is fixedly coupled to the frame 12 adjacent to but spaced from the magnet 18. The magnetic element 20 has a wire coil 22 coupled to it, the coil usually surrounding at least part of the length of the magnet.

The coil 22 is energized by applying current to it through the leads 19, 21. A suitable circuit for applying current to the coil 22 is shown in FIGURE 2.

The circuit of FIGURE 2 includes a source of fixed voltage 130, indicated as a battery, for example, a source of variable voltage 132, a pair of condensers 134, 136, a pair of single pole, double throw switches 138, 140, and a single pole, multiple throw switch 142.

The voltage source 130 has its positive terminal connected to a ground and its negative terminal connected to one throw of the single pole, double throw switch 140. The condenser 136 is connected between ground and the movable contact 144 of the switch 140.

The variable voltage source 132 has its negative terminal connected to ground and its positive terminal connected to one of the throws of the switch 138. The condenser 134 is connected between ground and the moving contact 146 of the switch 138. The second throw of each of the switches 138, 140 are connected together and to the movable contact 148 of the single pole multiple throw switch 142.

Each of the contacts or throws 150, 152, 154, 156, 158, for example, are connected to one end of a coil (such as the coil 22, for example) which is coupled to a permanent magnet (such as magnet 20, for example) of a transducer device 10. The other end of each coil is connected to a common ground.

In operation, using the circuit of FIGURE 2, with the moving contact 148 of the switch 142 set to the throw 154, to which the coil 22 (see FIGURE 1 also) is coupled, the condenser 136 is charged by moving the contact 144 to couple the condenser 136 across the source of fixed voltage 130. The contact 144 is then connected to the other throw of the switch 140, discharging the condenser 136 across the switch 142, through the coil 22, to ground, thus driving the magnetization of the magnet 20 to an index level of magnetization.

The variable voltage source 132 is then set to the potential which will induce the requisite degree of magnetization of the magnet 20 when the coil 22 is pulsed in the opposite direction. (The variable voltage source and the fixed voltage source are polarized opposite with respect to ground.)

With the contact 146 of the switch 138 coupled to the now pre-set variable voltage source 132, the condenser 134 is charged to the level set by the voltage source 132.

The contact 146 on switch 138 is then coupled to the other throw of that switch, discharging the condenser 134 through the switch 142 and coil 22 to ground (with the condenser 136 disconnected from the discharge circuit). This last pulse, oppositely polarized with respect to the pulse which occurred when the condenser 136 was discharged, produces a degree of magnetization in the magnet 20 which is proportional to the level, output or amount of control to be accomplished by the transducer device 10.

The magnet 20 may be magnetized with respect to the magnet 18 so that they repel each other, are neutral to each other, or attract each other; the resulting force exerted on the beam by the magnets 20, 18 being a function of the level and polarity of magnetization induced in the magnet 20 (assuming the magnetization of magnet 18 remains constant).

If the force caused by the interaction of the magnets 20, 18 is a repelling force, that force would tend to push the arm 14 of the balance beam away from the magnet 20, pivoting the beam 14 and thereby moving the laminated metal section 44 in the air gap between the pole pieces 50, 52 of the detector 49.

The change in position of the laminated element 44 causes a change in the output of the detector 49. The change in detector output, coupled to the amplifier 68, results in a change in amplifier output.

The output of the amplifier, connected in series with the coil 74, load 82 and power supply 84, has a varying signal current which is a function of the position of the laminated element 44 in the air gap between the poles 50, 52. The output current flowing through the coil, however, is of such value that it exerts a restoring force in conjunction with the magnet 70 which offsets the force exerted on the beam section 14 by the interaction of the magnetic forces of the magnets 18, 20.

The tension on the spring 88 is adjusted by means of the zero adjustment screw 87 to exert the proper force on the rod 86 so that the variations in amplifier output signal result in the beam being balanced against the force exerted by the interaction of the fields of the magnets 18, 20.

The load 82 may be an actuating device which is capable of operation over a current variation range normal to such devices (10 to 50 milliamperes, for example). Alternatively, the load may be the input circuit of a device which has a larger output capacity to drive an actuating or other control or monitoring device.

It may be seen from the above that the present invention provides an effective means whereby positional control of a process control element may be maintained at a pre-determined level in response to electrical impulses applied to the device. It should be realized that the pulsing of the coil 22 from the condenser charged with a fixed voltage is followed rapidly by the pulsing from the condenser which is charged by the variable voltage whose value is a function of the positional control to be maintained by the device. Because of the rapidity at which the second pulse follows the first or reset pulse, the inertia of the device prevents any change in the positional stability when the reset pulse is applied.

The circuitry of FIGURE 2 is simplified in form, and in practice more sophisticated pulsing means would be provided. It may readily be seen, however, that as the contact 148 of the switch 142 is moved, other coils may be pulsed either in sequence or on a random basis.

What is claimed is:

1. Force transducer apparatus comprising a frame, a balance beam, pivot means, said pivot means being fixedly coupled to said frame, said balance beam being movably coupled to said pivot means, electro-magnetic detection means including a magnetic core having a pair of spaced apart poles, said magnetic core being fixedly coupled to said frame, a metal element, said metal element being fixedly coupled to said balance beam and being disposed between said pole pieces, said detection means having circuit means coupled to the input of an amplifier having an input and output, an electromagnetic element and a first permanent magnetic element, one of said two last mentioned elements being fixedly coupled to said balance beam and the other element being fixedly coupled to said frame, said last mentioned two elements being spaced from one another but adapted to interact magnetically, said output of said amplifier being coupled to said electromagnetic element, a second permanent magnetic element and a permanently magnetizable element, one of said two last mentioned elements being fixedly coupled to said frame and the other element being fixedly coupled to said balance beam, and means for inducing discrete levels of magnetism in said magnetizable element at predetermined times, said magnetizable element being disposed adjacent to said second permanent magnet whereby their magnetic fields interact.

2. Apparatus in accordance with claim 1, wherein said balance beam is composed of a plurality of parts coupled together in motion transmitting relationship.

3. Apparatus in accordance with claim 1, wherein said means for inducing discrete levels of magnetism in said magnetizable element comprises a coil disposed around said magnetizable element.

4. Apparatus in accordance with claim 3, wherein means for energizing said coil are coupled to said coil.

5. Apparatus in accordance with claim 1, wherein said metal element is laminated.

6. Apparatus in accordance with claim 1, wherein said electromagnetic element is fixedly coupled to said balance beam.

7. Apparatus in accordance with claim 6, wherein said electromagnetic element is a tubular shaped coil.

8. Apparatus in accordance with claim 7, wherein said first permanent magnetic element is adapted to telescope within said electromagnetic element.

9. Apparatus in accordance with claim 1, wherein the output of said amplifier is coupled to said electromagnetic element in series with a load element.

10. Apparatus in accordance with claim 1, wherein said second permanent magnetic element and said permanently magnetizable element are bar-like in form.

11. Apparatus in accordance with claim 1, wherein said second permanent magnetic element is fixedly coupled to said balance beam.

12. Apparatus in accordance with claim 6, wherein said second permanent magnetic element is coupled to said balance beam at a substantial distance from said electromagnetic element.

References Cited
UNITED STATES PATENTS

| | | | |
|---|---|---|---|
| 2,546,657 | 3/1951 | Smoot | 318—32 |
| 2,686,893 | 8/1954 | Markson | 318—32 X |
| 2,849,669 | 8/1958 | Kinkel | 318—32 |
| 2,876,404 | 3/1959 | Hannula | 318—22 |
| 3,048,770 | 8/1962 | Nye et al. | |
| 3,243,238 | 3/1966 | Lyman | 318—22 X |

BENJAMIN DOBECK, *Primary Examiner.*

T. LYNCH, *Assistant Examiner.*